(12) United States Patent
Müller

(10) Patent No.: US 6,525,263 B2
(45) Date of Patent: Feb. 25, 2003

(54) AWNING

(76) Inventor: Hermann-Frank Müller, Lyngsbergstr. 3a, D-53177 Bonn (DE)

( * ) Notice: Subject to any disclaimer, the term of this patent is extended or adjusted under 35 U.S.C. 154(b) by 0 days.

(21) Appl. No.: 09/835,295

(22) Filed: Apr. 12, 2001

(65) Prior Publication Data

US 2002/0033190 A1 Mar. 21, 2002

(51) Int. Cl.[7] ............... H01L 31/042; H01L 31/058
(52) U.S. Cl. ............... 136/244; 136/291; 136/248; 52/173.3; 52/74; 248/273; 160/45; 160/61; 204/194
(58) Field of Search ............... 136/291, 244, 136/248; 52/173.3, 74; 248/273; 160/45, 61; 204/194

(56) References Cited

U.S. PATENT DOCUMENTS

| 4,841,731 A | * | 6/1989 | Tindell | 60/641.8 |
| 5,236,378 A | * | 8/1993 | Newman | 440/6 |
| 5,433,259 A | * | 7/1995 | Faludy | 160/67 |

FOREIGN PATENT DOCUMENTS

| DE | 4137569 A1 | * | 5/1992 |
| DE | 19825017 C1 | * | 9/1999 |
| JP | 7-41410 A | * | 2/1995 |
| JP | 2000-54174 A | * | 2/2000 |
| JP | 2001-35503 A | * | 2/2001 |
| WO | WO 99/61721 A2 | * | 12/1999 |

* cited by examiner

*Primary Examiner*—Alan Diamond
(74) *Attorney, Agent, or Firm*—R W Becker & Associates; R W Becker

(57) ABSTRACT

The present invention provides a removably securable blind or awning having solar modules for converting solar energy into another energy form. The awning has an electrolyzer and fuel cells, or a reformer and fuel cells, for additional storage of that surplus energy produced by the solar modules for which the customarily provided storage elements lack sufficient storage capacity. Hydrogen and oxygen tanks, electrolyzers, reformers, and fuel cells can be disposed by appropriate measures in the available space in and/or on the frame body of the awnings such that space outside of the awnings for such items need only be found on an exception basis. The storage and release from storage of energy is regulated by a bus system. Water from one of a number of different sources can be conducted to the electrolyzer via guide drains mounted on the awnings and/or via other assemblies.

16 Claims, No Drawings

AWNING

BACKGROUND OF THE INVENTION

The present invention relates to a blind or awning that is removably securable in its operating position, the blind or awning being suitable for the various uses which have been heretofore described in DE 19825017, DE 19844920, and DE 19930963. As therein noted, the solar cells associated with the blinds or awnings can, depending upon the number of solar cells, achieve a surplus of produced energy, which then must be stored. For this reason, batteries, especially high capacity condensers or capacitors, are provided. During peak energy use times, at approximately mid-day, a large supply of electrical energy is required in a block of numerous residences. The same applies as well for camping trailers, motor homes, and the like which are electrically heated in the winter or are cooled in the summer by air conditioning arrangements—desiccant cooling systems. The principle of desiccant cooling processes is the artificial differential increase of moist and dry temperatures of the air and the subsequent cooling via air moistening. Cost favorable surface collectors can be used for special applications in solar energy production in low temperature areas and the surface collectors can even provide a greater surface coverage percentage. The solar thermal system is disclosed in DE 19949001. It is conceivable to integrate such a system in the frame of a blind or awning. Batteries are not capable of making available a relatively large amount of energy within a short time and supporting this energy use over a longer time period.

SUMMARY OF THE INVENTION

The present invention offers a solution to the challenge of developing a fuel cell system that delivers a large amount of energy to energy users via its energy storage and is available as well for mobile implementation in, for example, catastrophe-impacted areas, in which it can be rapidly deployed.

A solution to this challenge is offered by the fuel cell technology. The raw material for production of hydrogen can comprise various compilations or arrangements such as, for example, water or methanol. The challenge of the present invention is the presentation of two different devices for refining methanol, water, and so forth. Hydrogen, oxygen, or gas mixtures have already been disclosed in the publication DE 10028001.

DETAILED DESCRIPTION OF THE PREFERRED EMBODIMENT

Reformers or converters convert carbon containing combustion materials such as, for example, methane or methyl alcohol, into hydrogen and oxygen. Electrolyzers transform or convert, for example, water, into hydrogen and oxygen. The hope exists that super conducting magnetic energy storage elements (SMES) are devices that may offer multiple use possibilities in electric networks. They can store a large amount of energy and can compensate or smooth out the current fluctuations that occur in poor weather with respect to the use of solar cells. Super conducting magnetic energy storage elements (SMES) are capable of being deployed intermediate solar cells (blinds or awnings) and electrolyzers or reformers. Alternatively or additionally, super conducting energy storage elements store the current from solar cells or fuel cells. Experiments with carbon containing combustion materials have shown that the reforming of the combustion materials with $CO_2$ instead of $H_2O$ unexpectedly slows the aging of the deployed catalyzers.

Fuel cell technology, as has already been noted in DE 19935009 and which is known, for example, from DE 4137569 and DE 4310843, in connection with energy production from solar cells, or, respectively, from photovoltaic arrangements, offers a solution to the challenge of the present invention. The storage of energy in such a manner should not, however, be limited to large scale arrangements only (see publication 4142566) but, rather, should also be implementable in the case of only a relatively small number of persons who can benefit therefrom—that is, for example, by the use of only a few blinds or awnings which are provided with solar cells or, respectively, solar cell strips. As an automatic actuation of such an energy storage arrangement is probably self-evident, a bus system is provided for regulating or controlling the arrangement, the bus system being operable, after the storage of the energy produced by the solar cells in the typical batteries or, respectively, high capacity condensers, to direct the surplus energy to an electrolyzer or a reformer. The electrolyzer separates, for example, the water conducted thereto into hydrogen and oxygen. These gases are stored in tanks provided for this purpose. From these tanks, hydrogen can be conducted as required to fuel cells in order to be transformed back into electricity and to thus regulate or compensate the energy usage from the energy storage devices.

The electrolyzer or reformer, which is disposed at a spaced apart disposition in a specially configured space, can, by corresponding construction, be provided on or, even in, the frame body of a awning. If such a configuration can also be configured for storing the hydrogen and oxygen and for supporting the fuel cells, an ideal awning can be created in this manner, which can be transported without problems to any particular operational location in which its usage is required.

The awnings can accept in their frames, via an assembly, the surface construction bodies of a desiccant cooling system and the required air supply and air exhaust can be controlled through the hollow profile. The desiccant cooling system is communicated with a bus system.

In connection with the energy production through solar cell strips, the use of thin film solar cells as support materials, planar materials, fabric material, or the like come to mind—additionally, solar cell strips can be provided which are configured without support material and thus can be connected with one another so as to thereby form a support material themselves. The water supply can be enhanced, at a minimum, through the supply of rainwater, dew water, or the condensed water of an air conditioning arrangement or the like if corresponding construction provisions are provided on the awnings, in known configurations, for suspending, conducting, and storing the water.

Instead of water, hydrogen, oxygen, or gas mixtures can be used as the gas storage system. Also, a hydrogen motor can be driven by the hydrogen, which has been provided by the reformer or the electrolyzer.

Additionally, the fuel cells can simultaneously provide two functions. The fuel cells replace the task of the reformers and produce hydrogen. The fuel cells replace the electrolyzer and produce hydrogen after the refinement thereof. In this manner, the frame space of the awning is better used. It is to be understood that the awning includes an electrical connector such as, for example, a plug or a socket. An additional apparatus can differentiate the desired voltage among direct current, alternating current, and high voltage current.

The specification incorporates by reference the disclosure of German priority documents 100 18 240.2 filed Apr. 12, 2000 and 100 28 001.3 filed Jun. 8, 2000.

The present invention is, of course, in no way restricted to the specific disclosure of the specification and drawings, but also encompasses any modifications within the scope of the appended claims.

What I claim is:

1. A removable awning, comprising: a frame body, at least one solar module operable to convert solar energy to another energy form; and at least one of an electrolyzer, a reformer, and an electrolyzer and a reformer which is supplied with energy from the at least one solar module and secured to the frame body of the awning and is operable to convert a compound into at least two constituent elements of which one constituent element is to be stored and subsequently transformed into energy.

2. A removable awning according to claim 1, wherein at least a selected one of a hydrogen tank and an oxygen tank is secured to the frame body of the awning.

3. A removable awning according to claim 1, wherein fuel cells are secured to the frame body of the awning.

4. A removable awning according to claim 1, wherein an air conditioning arrangement is secured to the frame body of the awning.

5. A removable awning according to claim 1, and further comprising an energy storage element secured to the frame body of the awning.

6. A removable awning according to claim 1, wherein a bus system is provided, which regulates or controls the operation of the at least one electrolyzer, reformer, and an electrolyzer and reformer.

7. A removable awning according to claim 1, and further comprising a water reservoir and a fluid conducting drain communicated with the water reservoir to conduct thereto rainwater and dew water.

8. A removable awning according to claim 1, and further comprising means for conducting condenser water to the electrolyzer.

9. A removable awning according to claim 1, wherein a hydrogen motor is driven thereby.

10. A removable awning according to claim 1, wherein a load controller produces a required tension for electrical operation of the at least one electrolyzer, reformer, and an electrolyzer and reformer.

11. A removable awning according to claim 1, and further comprising a super conducting magnetic energy storage element operable as an energy storage element.

12. A removable awning, comprising:

a frame body;

at least one solar module operable to convert solar energy to another energy form;

means for converting a compound into at least two constituent elements, the transforming means including at least one of an electrolyzer, a reformer, and an electrolyzer and a reformer, the converting means being secured to the frame body of the awning and the converting means being supplied with energy from the at least one solar module for its operation to convert the compound into the at least two constituent elements; and a constituent element storage device operatively connected to the converting means for storing one of the constituent elements.

13. A removable awning according to claim 12, and further comprising a downstream power generating device operably connected to the constituent element storage device for receiving the stored one constituent element therefrom and being operable to transform the one constituent element into energy.

14. A removable awning according to claim 13, wherein the downstream power generating device is a fuel cell.

15. A removable awning according to claim 14, wherein the converting means is operable to convert water into constituent elements of which hydrogen is the one constituent element and the constituent element storage device is operable to store hydrogen.

16. A removable awning according to claim 15, wherein the downstream power generating device is a fuel cell and the constituent element storage device supplies hydrogen to the fuel cell for conversion of the hydrogen by the fuel cell into electricity.

* * * * *